(12) United States Patent
Kim et al.

(10) Patent No.: US 9,091,608 B2
(45) Date of Patent: Jul. 28, 2015

(54) APPARATUS FOR MEASURING SHEARING FORCE UPON SITTING

(71) Applicants: Hyundai Motor Company, Seoul (KR); Yonsei University Wonju Industry—Academic Cooperation Foundation, Wonju, Gangwon-do (KR)

(72) Inventors: Hyung Joo Kim, Gyeonggi-do (KR); Sung Rae Kim, Gyeonggi-do (KR); In Ju Lee, Gyeonggi-do (KR); Han Sung Kim, Gangwon-do (KR); Young Kuen Cho, Gangwon-do (KR); Seong Guk Kim, Gangwon-do (KR); Dae Won Lee, Gangwon-do (KR)

(73) Assignees: Hyundai Motor Company, Seoul (KR); Yonsei University Wonju Industry-Academic Coop. Fnd., Wonju-Gangwon-Do (KR)

( * ) Notice: Subject to any disclaimer, the term of this patent is extended or adjusted under 35 U.S.C. 154(b) by 333 days.

(21) Appl. No.: 13/656,871

(22) Filed: Oct. 22, 2012

(65) Prior Publication Data
US 2013/0319073 A1   Dec. 5, 2013

(30) Foreign Application Priority Data
Jun. 5, 2012   (KR) .................. 10-2012-0060127

(51) Int. Cl.
*G01L 1/22* (2006.01)
*G01L 25/00* (2006.01)

(52) U.S. Cl.
CPC .. *G01L 1/22* (2013.01); *G01L 25/00* (2013.01)

(58) Field of Classification Search
CPC ................................. G01L 1/22; G01L 25/00
USPC ................................. 73/1.15, 768, 774, 855
See application file for complete search history.

(56) References Cited

U.S. PATENT DOCUMENTS 4,094,192 A * 6/1978 Watson et al. ............ 73/862.044
5,571,973 A * 11/1996 Taylot ....................... 73/862.046
(Continued)

FOREIGN PATENT DOCUMENTS

JP   2000136970 A   5/2000
KR   10-2006-0008554 A   1/2006
(Continued)

OTHER PUBLICATIONS

English Translation of JP2000-136970, May 16, 2000.*
(Continued)

*Primary Examiner* — Peter Macchiarolo
*Assistant Examiner* — Alexander Mercado
(74) *Attorney, Agent, or Firm* — Mintz Levin Cohn Ferris Glovsky and Popeo, P.C.; Peter F. Corless

(57) ABSTRACT

Disclosed is an apparatus for measuring a shearing force upon sitting in a seat in a vehicle. The apparatus includes a shearing force sensor, a signal processor, and a monitoring device. The shearing force sensor is disposed in a compartment in a seat and senses the shearing force generated upon sitting on the seat. The signal processor filters and amplifies a signal from the shearing force sensor 10, and converts an amplified analog signal into a digital signal. The monitoring device analyzes the signal converted by the signal processor and displays the signal. As a result, the apparatus measures all directions of shearing forces generated upon sitting.

8 Claims, 10 Drawing Sheets

(56) References Cited

U.S. PATENT DOCUMENTS

| | | | |
|---|---|---|---|
| 5,913,245 A * | 6/1999 | Grossman | 73/800 |
| 5,991,676 A * | 11/1999 | Podoloff et al. | 701/45 |
| 6,523,417 B1 * | 2/2003 | Donahue et al. | 73/800 |
| 6,688,185 B2 * | 2/2004 | Knox et al. | 73/862.045 |
| 6,829,943 B2 * | 12/2004 | Weyand et al. | 73/760 |
| 6,839,642 B2 * | 1/2005 | Kawakita et al. | 702/42 |
| 6,912,912 B2 * | 7/2005 | Reichinger et al. | 73/800 |
| 6,912,915 B2 | 7/2005 | Jian et al. | |
| 6,993,954 B1 * | 2/2006 | George et al. | 73/1.15 |
| 7,090,647 B2 * | 8/2006 | Mimura et al. | 600/587 |
| 7,391,223 B2 * | 6/2008 | Howard et al. | 324/662 |
| 7,536,920 B2 * | 5/2009 | Decoster | 73/781 |
| 8,049,520 B2 * | 11/2011 | Schleeh | 324/663 |
| 2003/0115968 A1 * | 6/2003 | Doemens et al. | 73/780 |
| 2005/0022606 A1 * | 2/2005 | Partin et al. | 73/773 |
| 2006/0162464 A1 * | 7/2006 | Hayashi et al. | 73/818 |
| 2006/0219460 A1 * | 10/2006 | Wanami | 180/273 |
| 2007/0056385 A1 * | 3/2007 | Lorenz | 73/818 |
| 2007/0180921 A1 * | 8/2007 | Gaines | 73/774 |
| 2008/0190210 A1 * | 8/2008 | Harish et al. | 73/780 |
| 2008/0202251 A1 * | 8/2008 | Serban et al. | 73/780 |
| 2009/0064792 A1 * | 3/2009 | Kawabata et al. | 73/781 |
| 2009/0120198 A1 * | 5/2009 | Dallenbach et al. | 73/780 |
| 2009/0145239 A1 * | 6/2009 | Girshovich et al. | 73/779 |
| 2010/0052380 A1 * | 3/2010 | Lee | 297/217.2 |
| 2010/0192698 A1 * | 8/2010 | Hansen et al. | 73/779 |
| 2012/0144924 A1 * | 6/2012 | Kotovsky | 73/777 |
| 2013/0104666 A1 * | 5/2013 | Takuma et al. | 73/855 |

FOREIGN PATENT DOCUMENTS

| | | |
|---|---|---|
| KR | 10-0594758 | 1/2006 |
| KR | 10-0750240 | 8/2007 |

OTHER PUBLICATIONS

Kim et al., "A Study of Shear Force Measurement in Various Seat Postures", Department of Bio Medical Engineering, Yonsei University.

* cited by examiner

APPARATUS FOR MEASURING SHEARING FORCE UPON SITTING

CROSS-REFERENCE TO RELATED APPLICATION

This application claims under 35 U.S.C. §119(a) the benefit of Korean Patent Application No. 10-2012-0060127 filed Jun. 5, 2012, the entire contents of which are incorporated herein by reference.

BACKGROUND (a) Technical Field

The present invention relates to an apparatus for measuring a shearing force upon sitting. More particularly, the present invention relates to an apparatus for measuring a shearing force upon sitting, which can measure a shearing force generated upon sitting.

(b) Background Art

Recently, the performance and comfort level of vehicles are being significantly improved due to the remarkable advancement of various engineering technologies. In particular, there is a large amount of interest surrounding the comfort level of seats in a vehicle, given that individuals spend a significant portion of their day in their vehicle.

Overtime seats in automobiles have evolved into different styles and forms due to demands that are a result of culture, trends, and differing body physiologies. Accordingly, a great deal of research has been conducted on the comfort level of seats in vehicles to meet these demands in different countries.

Since there are a plethora of body types that can be expected to use any one vehicle, automobile seats are designed to receive a wide range of body sizes and shapes and are typically configured to protect a driver and a passenger from vibrations and shocks from the road.

Academic studies concentrated around anatomy, behavioral science, biomechanics, and physiology are all combined in order to design seats that meet the demands of consumers. The development on automobile seats has become one of the main research projects of most automobile manufactures, and this research is generally divided into two genres. One is a study of a position of a vehicle or anthropometrical requirements associated with the seats, and the other is a study of the comfort level of an automobile seat.

For example, when sitting on an office chair and an automobile seat, the degree of comfort or discomfort is mostly determined by the quality of the material of the seat and/or the sitting posture. Since muscle fatigue and load applied to the lumbar vary according to the condition of the seat, the muscle fatigue and the load applied to the lumbar needs to be sufficiently considered in order to develop a seat of high degree of comfort.

As a part of methods of evaluating the comfort level of an automobile seat, an Automotive Performance, Execution and Layout (APEAL) survey, a survey of subjects and an uncomfortableness evaluation on contact parts through a pressure distribution of a seat cushion are typically conducted. However, even though the performance and comfort level of automobile seats in general has increased. These surveys still show that the level of comfort is not what one skilled in the art would refer to as excellent.

In other words, according to the APEAL survey, the evaluation results on the level of comfort of automobile seats shows that seats of small-sized and mid- or small-sized vehicles are at a lower to middle level of comfort, and seats of mid-sized and mid- or full-sized vehicles are at an upper to middle level of comfort currently.

Also, according to the survey from subjects and the uncomfortableness evaluation on contact parts through the pressure distribution of the seat cushion, since lumbar uncomfortableness and muscle fatigue are impossible to measure using any of the existing methods offered to automobile manufactures, a quantitative evaluation on the pressure exerted on the waist region of an individual is considerably affected by that particular individuals sitting posture and thus tests results are high erratic and unpredictable.

Some methods have been developed for measuring a pressure distribution of the seat cushion. However, these methods only consider the load that is perpendicular to the vertebral body. Furthermore, the uncomfortableness of seats is also affected by a shearing force (force that acts on a specific plane in a tangential direction, which is one of mechanical stimuli applied to a human body upon sitting) generated upon sitting in addition to the vertical load. Accordingly, a more intricate evaluation method is needed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus for measuring a shearing force upon sitting with a high degree of accuracy, which can measure shearing forces applied to major body parts contacting a specific portion of seat upon sitting in the seat, by installing a shearing force sensor in these portions of the seat. The present invention also provides an apparatus for testing a shearing force sensor, which can verify whether an output value of the shearing force sensor is equal to a shearing force that is actually applied.

In one aspect, the present invention provides an apparatus for measuring a shearing force upon sitting in a seat. This apparatus includes a shearing force sensor disposed in a portion of seat that is configured to sense the shearing force generated upon sitting in the seat. Also included is a signal processor that is configured to filter and amplify a signal from the shearing force sensor and convert an amplified analog signal into a digital signal. Subsequently, a monitoring device, such as a computer, is configured to analyze the signal converted by the signal processor and display the signal on a screen. More specifically, the apparatus described above is configured to measure all directions of shearing forces generated upon sitting to thereby provide a highly accurate data that can be used for designing a seat with a high degree of comfort.

In an exemplary embodiment, the shearing force sensor may include a lower plate, a middle plate, and an upper plate that are stacked in a three-layered structure. In some embodiments, the middle plate may include: a cross-shaped strain gauge fixing plate inducing independent strains by including strain gauges in transverse and longitudinal directions attached thereto; and a fixing part separately disposed across the strain gauge fixing plate and configured to allow the strain gauge fixing plate to be fixed between the lower plate and the upper plate to respond to shearing forces in all or every direction.

In still another exemplary embodiment, the middle plate may be mounted with a ball bearing that prevents the middle plate from contacting the upper plate so as not to be affected by a vertical load applied to the upper plate.

In yet another exemplary embodiment, the apparatus may further include a shearing force sensor test apparatus for verifying whether a measurement value of the shearing force sensor is equal to a shearing force that is actually applied. The shearing force sensor test apparatus may include: a sensor fixing part for fixing the shearing sensor on a horizontal plane; a pulley part connected to the sensor fixing part using a wire to convert a vertical force applied to the shearing force sensor into a horizontal force; and a standard weight placed on a lower end of the wire downwardly extending from the pulley part to apply a load. In particular, the accuracy of the measurement value of the shearing force sensor is verified by comparing a mass of the standard weight with a value measured by the shearing force sensor.

In a further exemplary embodiment, the lower plate, the middle plate, and the upper plate may be prevented from being separated from each other by fixing corners thereof with fixing strings.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
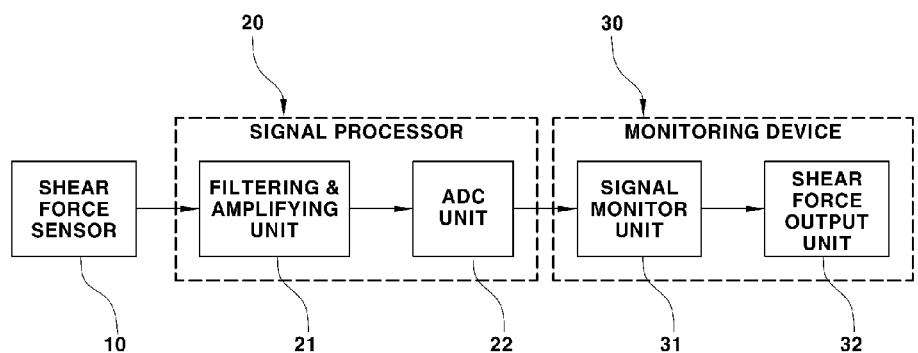
FIG. 1 is a view illustrating a configuration of an apparatus for measuring/detecting a shearing force upon sitting in a seat in a vehicle according to an exemplary embodiment of the present invention.

Reference numerals set forth in the Drawings includes reference to the following elements as further discussed below:

1: seat
1a: seat part
1b: back part
2: thigh part
3: right and left sides of thigh part
4: hip part
5: backbone part
6: right and left sides of backbone part
10: shearing force sensor
11: upper part
12: middle part
13: strain gauge fixing plate
13a: longitudinal member
13b: transverse member
13c: adhesive plate
14: fixing part
14a: first fixing part
14b: second fixing part
14c: ball bearing insertion aperture
14d: insertion aperture
15: lower plate
15a: wire insertion aperture
16: strain gauge
17: fixing aperture
18: fixing string
19: ball bearing
20: signal processor
21: filtering & amplifying unit
22: ADC unit
30: monitoring device
31: signal monitor unit
32: shearing force output unit
100: sensor fixing unit
110: base plate
111: vertical bar
112: upper plate
113: mounting groove
114: hinge groove
115: hexagonal bolt
120: pulley unit
120a: guide groove
121: wire
122: weight supporting stem
123: weight support
130: standard weight
141: lower fixing plate
142: cover plate
143: sensor receiving recess It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The above and other features of the invention are discussed infra.

Hereinafter, exemplary embodiment of the present invention will be described in detain with reference to the accompanying drawings.

Figure 2:
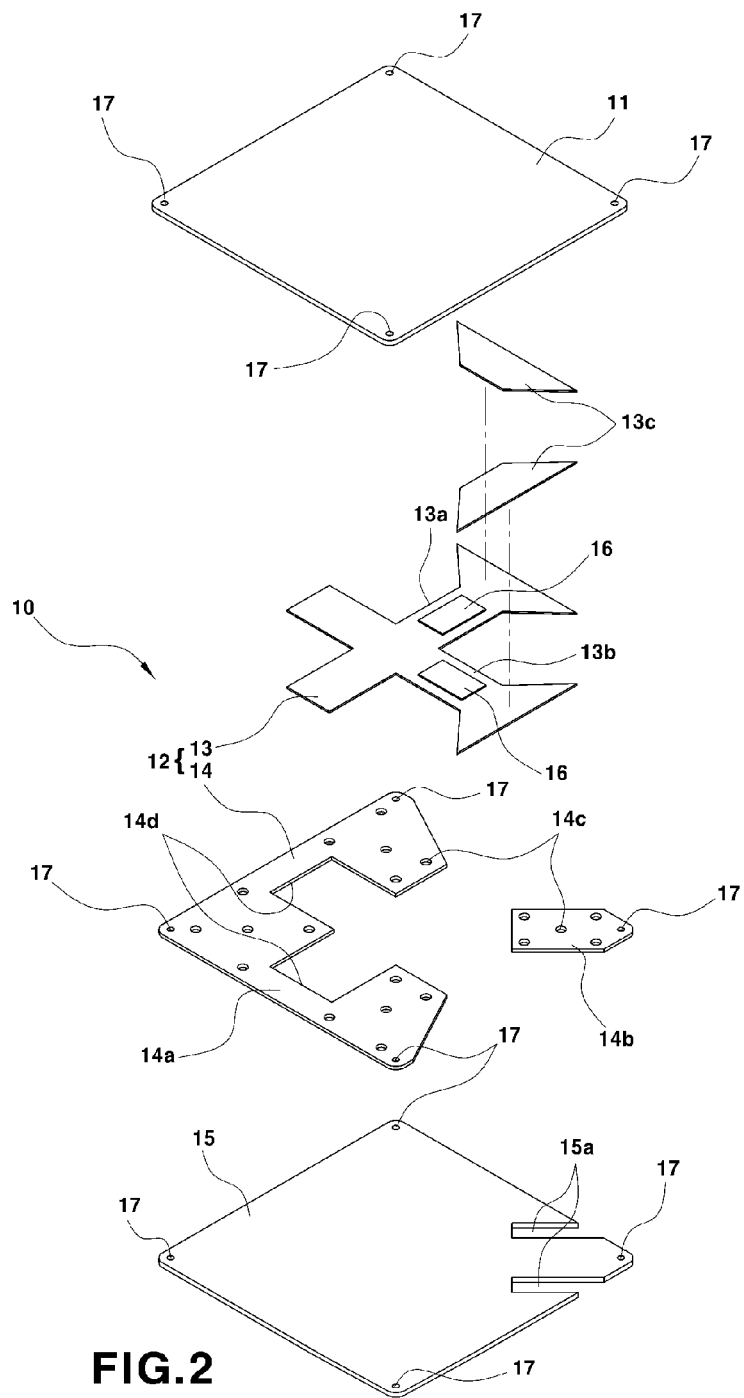
FIG. 2 is an exploded view illustrating a structure of a shearing force sensor in FIG. 1.
Figure 3:
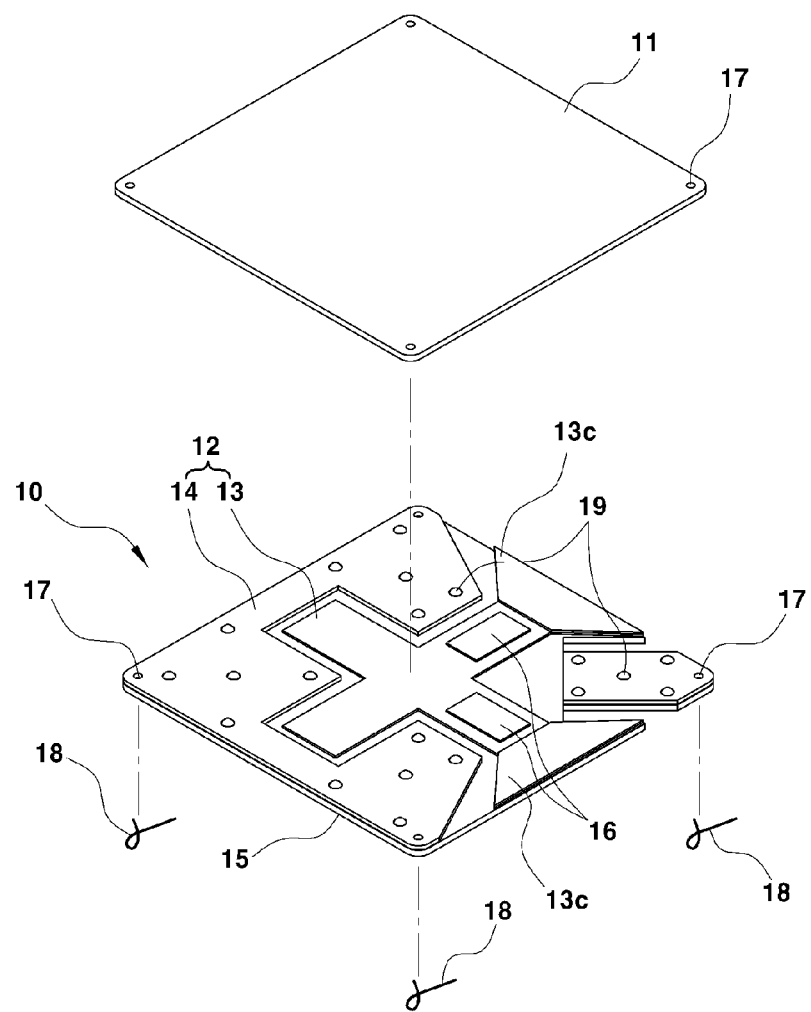
FIG. 3 is a partially exploded view illustrating a structure of a strain gauge fixing plate and a fixing part of a middle plate in FIG. 2.
Figure 4:
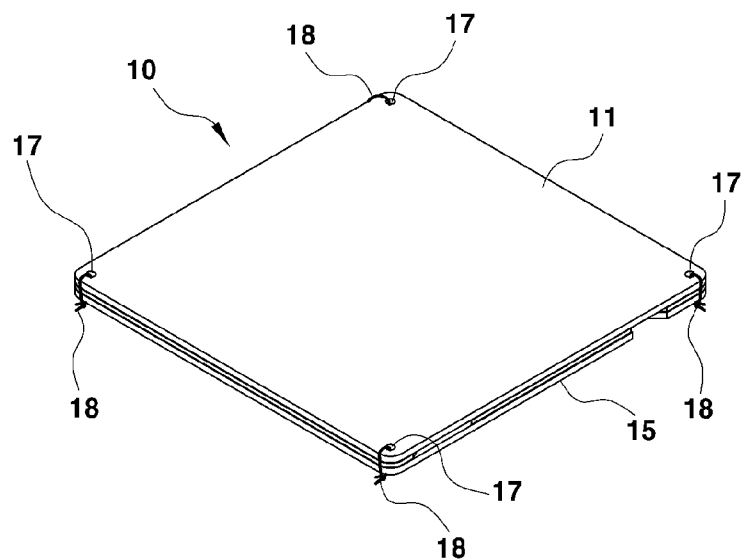
FIG. 4 is an assembly view of FIG. 2.

FIG. 1 is a view illustrating a configuration of an apparatus for detecting/measuring a shearing force upon sitting in a seat according to an exemplary embodiment of the present invention. FIG. 2 is an exploded view illustrating a structure of a shearing force sensor in FIG. 1. FIG. 3 is a partially exploded view illustrating a structure of a strain gauge fixing plate 13 and a fixing part 14 of a middle plate in FIG. 2. FIG. 4 is an assembly view of FIG. 2.

The present invention relates to a shearing force measuring apparatus that that is configured to measure a shearing force generated in a seat part 1a upon sitting in the seat 1. The shearing force measuring apparatus may include a shearing sensor 10, a signal processor 20, and a monitoring device 30. The shearing sensor 10 may be disposed on a seat part 1a to measure a shearing force upon sitting. The signal processor 20 may amplify an output signal from the shearing force sensor 10, and may convert the output signal into a digital signal. The monitoring device 30 may analyze and display the digital signal accordingly based upon an algorithm specifically designed to do so. The design of this algorithm is dependent up on the operating system being executed by the monitoring device and thus, one skilled in the art would understand how such a monitoring device should be configured to perform the following processes which are executed by a processor on the monitoring device.

The shearing force sensor 10 may be attached to major parts of the seat 1 that are expected to directly contact the human body upon sitting to measure shearing forces applied to each part of the seat 1 upon sitting. The shearing force sensor 10 may measure shearing forces upon sitting using a strain gauge 16 that is configured to measure a uni-directional strain. Furthermore, the shearing force sensor 10 may have a shape of a quadrangular plate as a whole, and may be stacked forming a three layer embodiment. The three layer embodiment may include a lower plate 15, a middle plate 12, and an upper plate 11. Notably, however, although the lower plate 15, the middle plate 12, and the upper plate 11 may have a quadrangular plate structure, embodiments are not limited to the quadrangular plate structure.

The lower plate 15 may serve to fix the sensor to the seat part 1a. The middle plate 12 may be attached to the strain gauge 16 to substantially measure a shearing force, and the upper plate 11 may be a plate to which a shearing load generated upon sitting is directly applied In this case, the strain gauge 16 may be embodied as either a film or plate, and may have a thickness relatively smaller than the thickness of the middle plate 12. The strain gauge 16 may be disposed between the upper plate 11 and the lower plate 15 so as to measure a shearing force applied to the upper plate 11.

The shearing force sensor 10 may further include a fixing string 18 that is configured to prevent the separation of the lower plate 15, the middle plate 12, and the upper plate 11 and fix each of the plates in their respective locations.

The lower plate 15, the middle plate 12, and the upper plate 11 may have four fixing apertures 17 at the corners thereof, respectively. The fixing apertures 16 may be vertically aligned with each other when the lower plate 15, the middle plate 12, and the upper plate 11 are stacked and the edges of each layer are placed on the same vertical plane. The corners of the lower plate 15, the middle plate 12, and the upper plate 11 may be connected and fixed to each other by penetrating the fixing strings 18 into the fixing apertures 17 aligned with each other and binding the fixing strings 18. This fixing string 18, for example, may be formed of a material such as a fishing line, which can endure a heavy load without being easily broken. Also, the upper plate 11, the middle plate 12 (particularly, a fixing part (14)), and the lower plate 15 may be formed of an aluminum alloy.

The middle plate 12 may include a strain gauge fixing plate 13 to which the strain gauge is attached, and the fixing part 14 for fixing the strain gauge fixing plate 13 and the upper plate 11. The strain gauge fixing plate 13 may be a plate to which the strain gauge 16 is fixed. The strain gauge fixing plate 13 may have a cross-shaped structure that can induce independent strains in the transverse and longitudinal directions of the fixing plate.

When viewed from the top, the strain gauge fixing plate 13 of the cross-shaped structure may include a transverse member 13b that is longitudinally disposed from right to left, and a longitudinal member 13a that is longitudinally disposed in the vertical direction from the center of the transverse member 13b.

The uni-directional strain gauge 16 may be attached to the right half part of the transverse member 13b and the upper half part of the longitudinal member 13a, respectively. Here, both ends of the transverse member 13b and the longitudinal member 13a of the strain gauge fixing plate 13 are fixed to the upper plate 11 and the lower plate 15 to measure independent strains in the transverse and longitudinal directions using the strain gauge 16.

Hereinafter, a fixing structure of the strain gauge fixing plate 13 will be described in detail as follows.

The undersurface of the left half part, i.e., from the left end portion to the central crossing portion of the transverse member 13b and the under surface of the lower half part, i.e., from the lower end portion to the central crossing portion of the longitudinal member 13a may be fixed to the lower plate with an adhesive, respectively. The right end portion of the transverse member 13b and the upper end portion of the longitudinal member 13a may have an inverted triangular shape, a lateral protrusion of which becomes gradually wider at the end thereof. Trapezoidal adhesive plates 13c having the same size as the lateral protrusion may be stacked on the lateral protrusion. Furthermore, the right end portion of the transverse member 13b and the upper end portion of the longitudinal member 13a may be fixed to the upper plate 11 by adhering the adhesive plate 13c to the transverse member 13b and the longitudinal member 13a with an adhesive. As result, the adhesive plate 13c is not affected by a vertical load applied to the upper plate 11 upon measurement of a shearing force.

Since the sum of the thickness of the strain gauge fixing plate 13 and the thickness of the strain gauge 16 is less than the diameter of a ball bearing 19 or the thickness of the fixing part 14, when the horizontal and longitudinal members 13b and 13a of the strain gauge fixing plate 13 are directly adhered to the upper plate 11, the right end portion of the transverse member 13b and the upper end portion of the longitudinal member 13a that are adhered to the upper plate 11 may be bent upward compared to the left half part of the transverse member 13b and the lower half part of the longitudinal member 13a that are adhered to the lower plate 15, causing an measurement error upon measurement of a shearing force.

Accordingly, when the strain gauge fixing plate 13 is fixed between the upper plate 11 and the lower plate 15, the strain gauge fixing plate 13 is prevented from being partially bent by controlling the thickness of the adhesive plate 13c, and an independent strain generated by a shearing force as a result is more accurately measured by minimizing the influence of a vertical load applied to the upper plate 11. In some exemplary embodiments of the present invention, the strain gauge fixing plate 13 may be formed of an insulating material like plastics such as Polyvinyl Chloride (PVC).

The fixing part 14 may be a plate that is configured to fix the upper plate 11 and the strain gauge fixing plate 13, and may be disposed on the substantially same plane as the strain gauge fixing plate 12 between the upper plate 11 and the lower plate 15. The fixing part 14 may be formed of an aluminum alloy, and may include a first fixing part 14a and a second fixing part 14b. The first fixing part 14a may have a plurality of insertion apertures 14d into which the end portions of the transverse member 13b and the longitudinal member 13a of the cross-shaped strain gauge fixing plate 13 can be inserted, respectively. The second fixing part 14b may be disposed spaced from the first fixing part 14a in a diagonal direction.

In this case, the first fixing part 14a may have a triangular shape, and the second fixing part 14b may have a pentagonal shape. The cross-shaped strain gauge fixing plate 13 may be inserted between the first fixing part 14a and the second fixing part 14b. The first fixing part 14a, the cross-shaped strain gauge fixing plate 13, and the second fixing part 14b may be disposed on the substantially same plane to form a square.

The first fixing part 14a may have the fixing apertures 17 at three corners thereof, and the second fixing part 14b may have one fixing aperture 17 at one corner thereof. The first and second fixing parts 14a and 14b may be fixed to the upper plate 11 and the lower plate 15 using the fixing strings 18. Additionally, the cross-shaped strain gauge fixing plate 13 may be directly fixed to the upper plate 11 and the lower plate 15 with an adhesive.

A load generated upon sitting may be divided into a vertical load acting in a vertical direction with respect to the upper plate 11 of the shearing force sensor 10, and a shearing load (shearing force) acting in parallel with the upper plate 11 of the shearing force sensor 10. Often, the vertical load and the shearing force will occur at the same time.

As described above, a shearing force is measured in the exemplary embodiment of the present invention at this point. Upon measurement of a shearing force, the strain gauge 16 should not be affected by a vertical load generated upon sitting. For this, the first and second fixing parts 14a and 14b of the middle plate 12 may have a thickness greater than the sum of the thicknesses of the strain gauge 16 and the fixing plate thereof. Also, the first and second fixing parts 14a and 14b of the middle plate 12 may have a plurality of ball bearing insertion apertures 14c. Ball bearings 19 may be inserted into the ball bearing insertion apertures 14c, respectively.

When the thickness of the fixing part 14 is greater than the thickness of the strain gauge 16 and the fixing plate thereof, and the ball bearing 19 having a diameter greater than the thickness of the fixing part 14 is inserted into the insertion aperture 14c of the fixing part 14, the strain gauge 16 may not be pressurized by a vertical load generated upon sitting and may not be affected by the vertical load.

The ball bearing 19 may increase the reliability of the measurement of a shearing force generated upon sitting, by preventing the strain gauge 16 from contacting the upper plate 11 and minimizing a frictional force between the upper plate 11 and the middle plate 12 by a rolling contact with the upper plate 11. Thus, the shearing force sensor 10 may respond to shearing forces in all directions, and may output a strain reflecting the magnitude of a shearing force applied to the cross-shaped plastic plate as an electrical signal by including two strain gauges 16 in the transverse and longitudinal directions on a cross-shaped plastic plate that is deformable in the transverse and longitudinal directions. For example, the upper plate 11 may be covered with a leather material, minimizing sliding at an area that directly contacts a human body.

Two wire insertion apertures 15a may be formed in parallel at the right upper corner of the lower plate 15 in a diagonal direction. Wires connected to the two strain gauges 16 may be drawn out of the shearing force sensor 10 through the wire insertion apertures 15a. If the wire insertion apertures 15a are not formed, and the diameter of the wire is greater than the thickness of the middle plate 12, the wire may frictionally contact the upper plate 11, affecting the measurement of the shearing force of the strain gauge 16. Thus, since a measurement error can occur due to the friction between the upper plate 11 and the wire, it is desirable that the wire insertion aperture 15a is formed in the lower plate 15.

Hereinafter, a measurement principle of the shearing force sensor 10 will be described in detail as follows.

When a shearing force is applied to the upper plate 11 of the shearing force sensor 10 in a certain direction, the upper plate 11 may move in a certain direction, and the strain gauge fixing plate 13 connected to the upper plate 11 may be deformed in one direction. In this case, the strain gauge 16 attached to the strain gauge fixing plate 13 may measure a strain of the strain gauge fixing plate 13 to output the strain as an electrical signal.

The signal processor 20 may include a filtering & amplifying unit 21 and an Analog-Digital Converter (ADC) unit 22. The filtering & amplifying unit 21 may filter out any unnecessary signals among a plurality of signals outputted from the shearing force sensor 10, and may amplify only the necessary signals. Also, the filtering & amplifying unit 21 may be connected to the shearing force sensor 10. The ADC unit 22 may be connected to the filtering & amplifying unit 21 to convert an analog signal output from the filtering & amplifying unit 21 into a digital signal. It should be noted that the filtering & amplifying unit 21 and the ADC unit 22 may be arbitrarily selected from apparatuses well-known in the signal processing field.

The monitoring device 30 may include a signal monitor unit 31 and a shearing force output unit 32, and may be configured to analyze an output signal from the ADC unit 22 to display the output signal on a screen and store the output unit signal. The output signals of the monitoring device 30 may be processed by a monitoring program at the signal monitor unit 31 and the shearing force output unit 32, respectively, and may be outputted as graphs for each axis of the shearing force sensor 10.

The signal monitor unit 31 may be connected to the ADC unit 22 to convert the output signal from the ADC unit 22 into a shearing force that is applied. The shearing force output unit 32 may be connected to the signal monitor unit 31 to display the shearing force obtained by the signal monitor unit 31.

Hereinafter, a method for measuring a shearing force using the shearing force measurement apparatus upon sitting will be described in detain as follows.

When a user sits on a seat 1 equipped with the shearing force sensor 10, a shearing force may be generated on contact surfaces of a seat part 1a and a back part of the seat 1b. The shearing force sensor 10 disposed in the seat part 1a and the back part 1b is configured to measure strains generated according to the magnitude of shearing forces applied to the seat part 1a and the back part 1b using the strain gauges 16 disposed in the transverse and longitudinal direction, and outputs electrical signals accordingly.

Next, the signal processor 20 may filter and amplify the electrical signals output from the shearing force sensor 10, and may convert the amplified analog signals into digital signals. Thereafter, the monitoring device 30 may process the digital signals via a monitoring program executed by, e.g., a processor, to display the shearing force on a screen and output graphs for each axis of the shearing force sensor 10. The shearing force sensor 10 then verifies output signals for each sensor using individual characteristics errors generated from mechanical processing errors and the structural assembly. Accordingly, an apparatus for testing the shearing force sensor may be manufactured. When forces are applied to the shearing force sensor 10 in stages, is the output signals are verified if outputs are regularly shown in stages as well.

Figure 5:
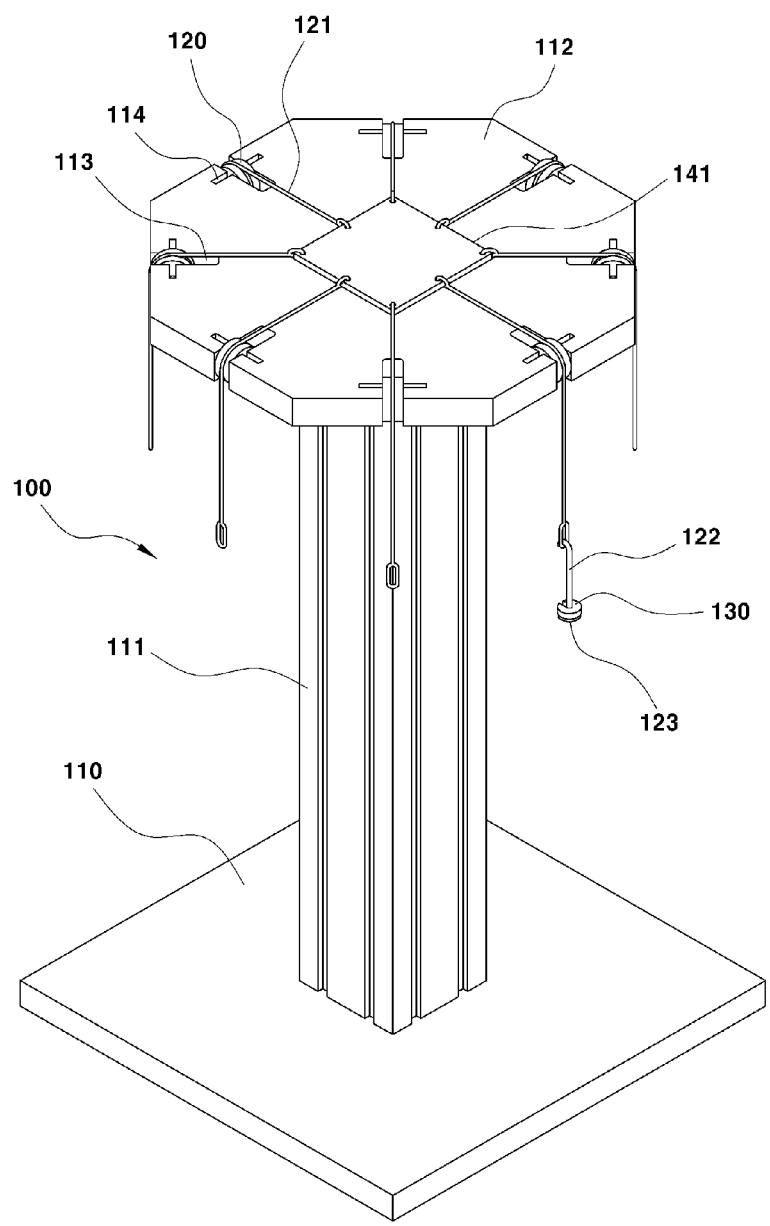
FIG. 5 is a perspective view of a shearing force sensor test apparatus according to an exemplary embodiment of the present invention.
Figure 6:
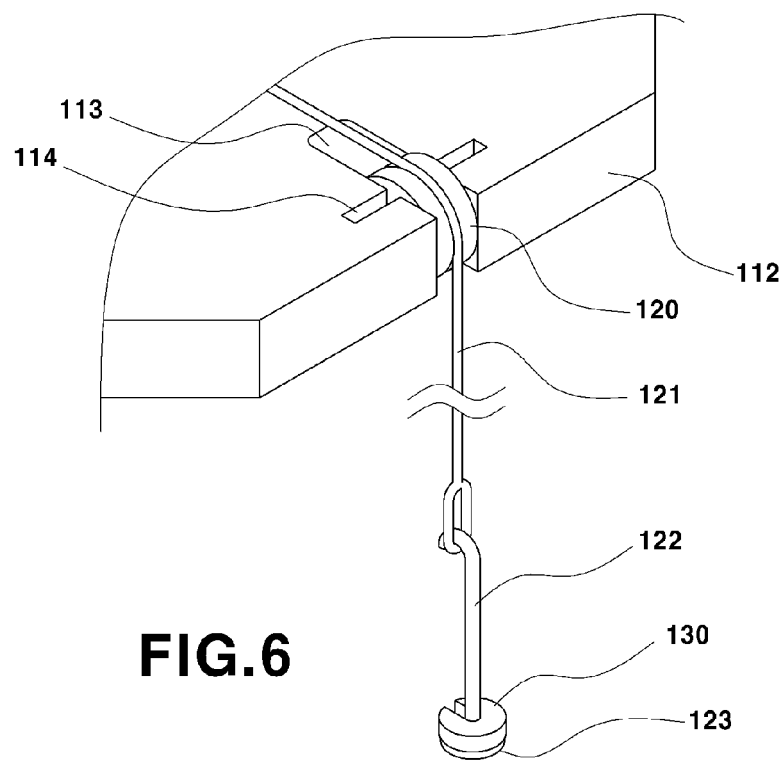
FIG. 6 is a partially magnified view illustrating a mounting structure of a pulley part in FIG. 5.
Figure 7:
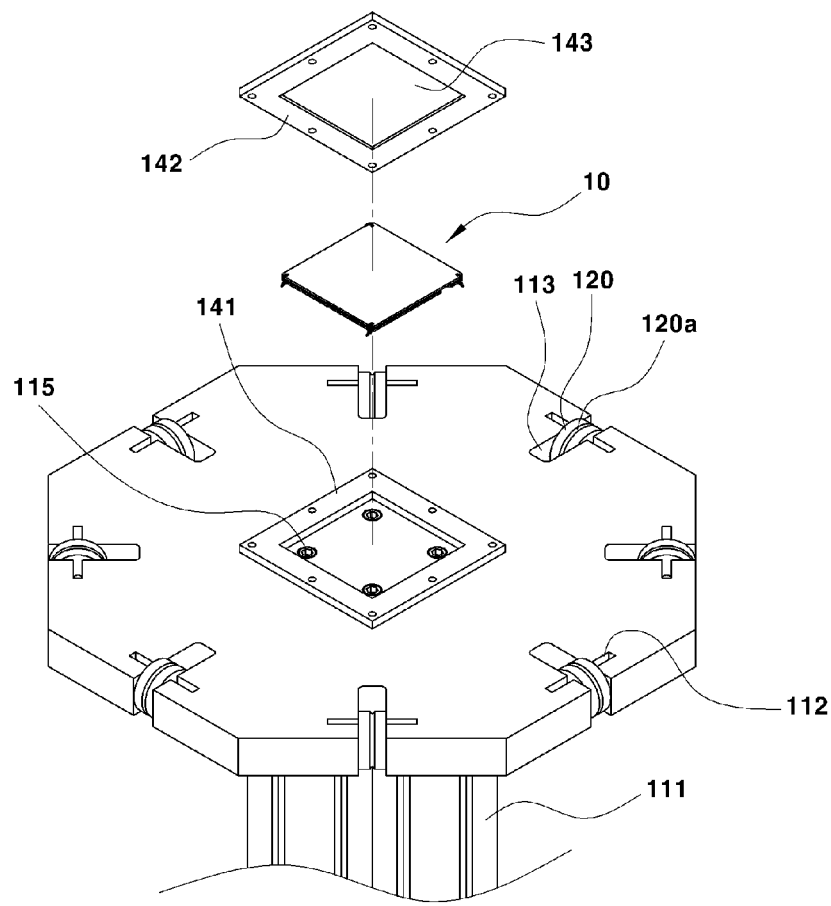
FIG. 7 is an exploded view of a sensor fixing part in FIG. 5.

FIG. 5 is a perspective view of a shearing force sensor test apparatus according to an exemplary embodiment of the present invention. FIG. 6 is a partially magnified view illustrating a mounting structure of a pulley part 120 in FIG. 5. FIG. 7 is an exploded view of a sensor fixing part 32 in FIG. 5.

The present disclosure provides an apparatus for testing a shearing force sensor to verify whether the output values of the shearing force sensor by the shearing force measurement apparatus are substantially identical to shearing forces that are actually applied. The shearing force sensor test apparatus may include a sensor fixing unit 32 for fixing the shearing force sensor 10 and a pulley unit 120 for converting a vertical force applied to the shearing force sensor 10 into a horizontal force.

The sensor fixing unit 32 may include a base plate 110 disposed on a horizontal plane, a vertical pillar 111 upwardly extending from the center of the base plate 110, and an upper plate 112 horizontally disposed on the vertical pillar 111. The upper plate 112 may have an octagonal shape, and may have mounting grooves 113 for mounting the pulley unit 120 at a certain interval along the edges of the octagonal upper plate 112 in a radial direction. Also, the upper plate 112 may have hinge grooves 114 for supporting the central axis of a pulley in a direction perpendicular to the radial direction.

Also, a fixing plate may be disposed at the central portion of the upper plate 112 to fix the shearing force sensor 10. The fixing plate may include a lower fixing plate 141 having a sensor receiving aperture therein and having a quadrangular shape, and a cover plate 142 having a sensor receiving recess 143 with a quadrangular shape therein. The lower plate 15 of the shearing force sensor 10 may be inserted into and fixed to the sensor receiving aperture of the lower fixing plate 141, and the upper plate 11 of the shearing force sensor 10 may be inserted into and fixed to the sensor receiving recess 143 of the cover plate 142.

The pulley unit 120 may include a cylindrical roller. The roller may be supported by the central axis penetrating in a lateral direction thereof. A guide groove 120a may be formed in the outer circumferential surface of the roller to prevent a wire 121 from escaping from the guide groove 120a. One end portion of the wire 121 may be fixed at a certain interval along the edge portions of the cover plate receiving the upper plate 11 of the shearing force sensor 10, and the other end portion of the wire 121 may have a ring or clip shape that allows a standard weight 130 to be placed.

In order to hook the standard weight 130, a weight supporting hanger may be suspended on the other end portion of the wire 121. The weight supporting hanger may include a weight supporting stem 122 having a hook at the upper end thereof and a weight support 123 at the lower end thereof. While the standard weight 130 is being placed on the weight support 123, the weight supporting hanger may be hooked on the other end portion of the wire 121 by weight support stem 122.

A method of operating the test apparatus will be described below.

A plurality of standard weights 130 may be selectively placed on eight weight supporting hangers in desired directions. When a vertical load is applied by the standard weight 130, a vertical tension may be delivered to the pulley unit 120 through the wire 121, and the delivered tension may be converted into a horizontal tension through the pulley unit 120. Thereafter, the horizontal tension (shearing force) may be delivered to the cover plate 142 connected to the upper end portion of the wire 121.

As the delivered tension may move the cover plate 142 in a horizontal direction, and may move the upper plate 11 of the shearing force sensor 10 inserted into the cover plate 142, the shearing force sensor 10 can measure a shearing force applied to the upper plate 11 through the measurement method described above. In this case, the accuracy of a measurement value of the shearing force sensor 10 can be determined by determining whether a value measured by the shearing force sensor 10 is identical to the weight of the standard weight 130 placed on the weight supporting hanger of the test apparatus.

Hereinafter, the present invention will be described in more detail based on the following example, but the present invention should not be construed as limited thereto.

EXAMPLE

The following example illustrates the invention and is not intended to limit the same.

A shearing sensor 10 according to the exemplary embodiment of the present invention may have a dimensional width of about 54 mm, a length of about 54 mm, and a thickness of about 4.1 mm. An upper plate 11, a fixing part 14 of a middle plate 12, and an adhesive plate 13c having a trapezoidal shape, and a lower plate 15 were formed of an aluminum alloy 6061. A strain gauge fixing plate 13 was formed of a plastic material such as PVC.

Figure 8:
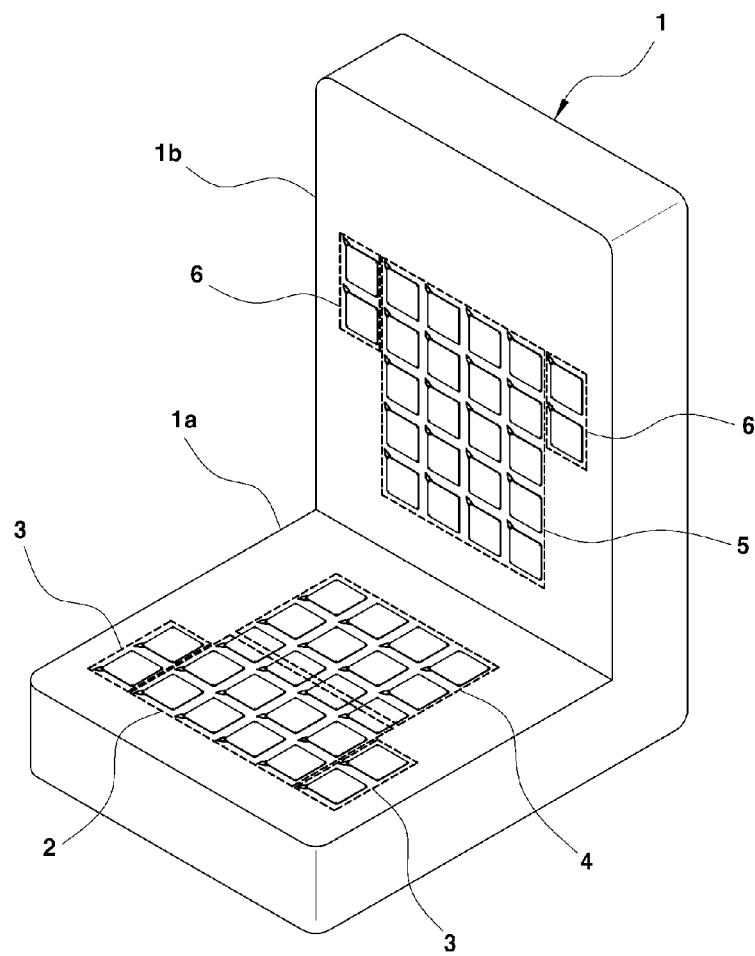
FIG. 8 is a perspective view illustrating a shearing force sensor of FIG. 4 attached to a seat.

As a strain gauge 16, AP-11-S50N-120EC (CAS, Korea) was attached to the strain gauge fixing plate 13 of the middle plate 12 of the shearing force sensor 10. The strain gauge 16 had a dimension of 12 mm×6 mm×0.1 mm, 120Ω. Also, the thickness of the fixing part 14 was about 1 mm, and the thickness of the strain gauge fixing plate 13 was about 0.4 mm. The diameter of a ball bearing 19 was about 1.5 mm FIG. 8 is a perspective view illustrating the shearing force sensor 10 of FIG. 4 attached to a seat. The shearing force sensor 10 with a three-layered structure was attached to a seat part 1a and a back part 1b of a seat 1 by the medium of a mat. The shearing force sensors 10 were fixed using an adhesive in/on a thigh part 2, a hip part 4, and a backbone part 5 of the seat 1 (i.e., high traffic points of contact for an individuals body on the seat).

When a user is sitting with his/her knees opened wide, an additional contact area may occur around the thigh part 2. Accordingly, the shearing force sensor 10 was further disposed at the right and left sides 3 of the thigh part 2 in the lateral and longitudinal directions at certain intervals. Also, when the back of a user is adhered closely to the back part 1b of the seat 1, another additional contact area may occur around the backbone part 5. Accordingly, the shearing force sensor 10 was further disposed at the right and left sides 6 of the back bone part 5.

The strain gauge 16 was attached to a cross-shaped strain gauge fixing plate 13 formed of a plastic material in the transverse and longitudinal directions, respectively. The mat was manufactured according to the size of the seat 1, and was formed to have a dimensional width of about 520 mm, a length of about 720 mm, and a thickness of about 1.2 mm. When the shearing force sensor 10 (i.e., with a thickness of about 4.3 mm) is attached, the thickness of the mat became about 5.3 mm In order to appropriately arrange the wires of the shearing force sensor 10, two sheets of cloth having a thickness of about 0.6 mm were used to allow the shearing force sensor 10 to be attached to an upper sheet of cloth. Also, an aperture for passing the wire therethrough was made in the cloth to allow the wire to be fixedly located between the two sheets of cloth.

Furthermore, a SCXI-1001 (National Instruments, US) was used as a filtering & amplifying unit 21 to filter and amplify output signals of the shearing force sensor 10, and a PXI-6225 (National Instruments, US) was used as an ADC unit to convert analog signals from the filtering & amplifying unit 21 into digital signals.

Output values of the shearing force sensor 10 can be shown by the monitoring device 30. Assuming a measurement value of the shearing force sensor 10 is x, an output values of the shearing force sensor 10 received from the monitoring device 30 may be calculated by Equation (1) to be outputted.

$$Y=20607.4x \quad (1)$$

Here, since the output sign of the strain gauge 16 attached to the cross-shaped plastic plate of the middle plate 12 of the shearing sensor 10 in the transverse and longitudinal directions varies with a variation of strain, the direction of a shearing force delivered to the upper plate 11 can be verified. In other words, when the output sign of the strain gauge 16 is a plus (+) sign, the shearing force acts in the opposite direction to the shearing force sensor 10. On the other hand, when the output sign of the strain gauge 16 is a minus (−) sign, the shearing force acts in the equal direction to the shearing force sensor 10.

For example, when a longitudinal output value of the shearing force sensor 10 disposed in the hip part 4 becomes greater in the plus direction, the direction of the shearing force becomes distant based on the hip. On the other hand, when a transverse output value of the shearing force sensor 10 disposed in the thigh part 2 becomes greater in the plus direction, the shearing force acts in the right direction at the right and left sides of the thigh part 2, the thigh part 2, and the hip part 4 upon sitting.

TEST EXAMPLE

With the shearing force sensor test apparatus of FIG. 5, the data was compared to determine whether an output value of the shearing force sensor 10 of FIG. 4 was outputted identically to a value of a shearing force that is actually applied. For examination of the output characteristics of the shearing force sensor 10, a standard weight was used to apply a uniform magnitude of shearing force to the shearing force sensor 10. The size of the weight was increased by stages to example the output characteristics of the shearing force sensor 10.

Regarding the same force, the output signals of the shearing force sensor 10 with respect to each axis were repeatedly measured six times. Also, whenever the repetitive measurement was performed regarding the same force, a sensor output when the weight is removed was verified to be a reference value so as not to be affected by the last test.

Hereinafter, a method for measuring a shearing force using the shearing force sensor 10 will be described in detail as follows.

Figure 9:
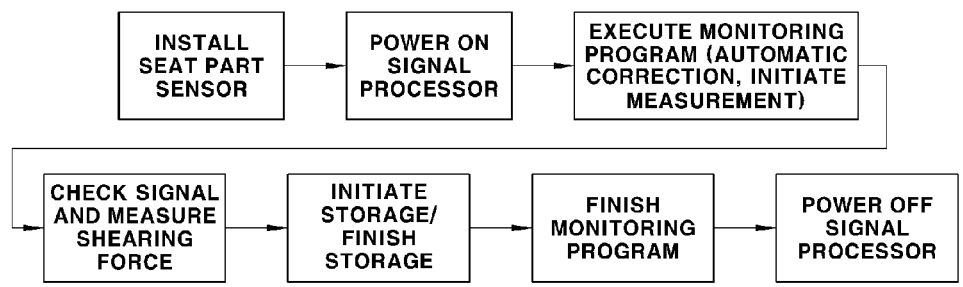
FIG. 9 is a flowchart illustrating a method for measuring a shearing force upon sitting according to an exemplary embodiment of the present invention.
Figure 10:
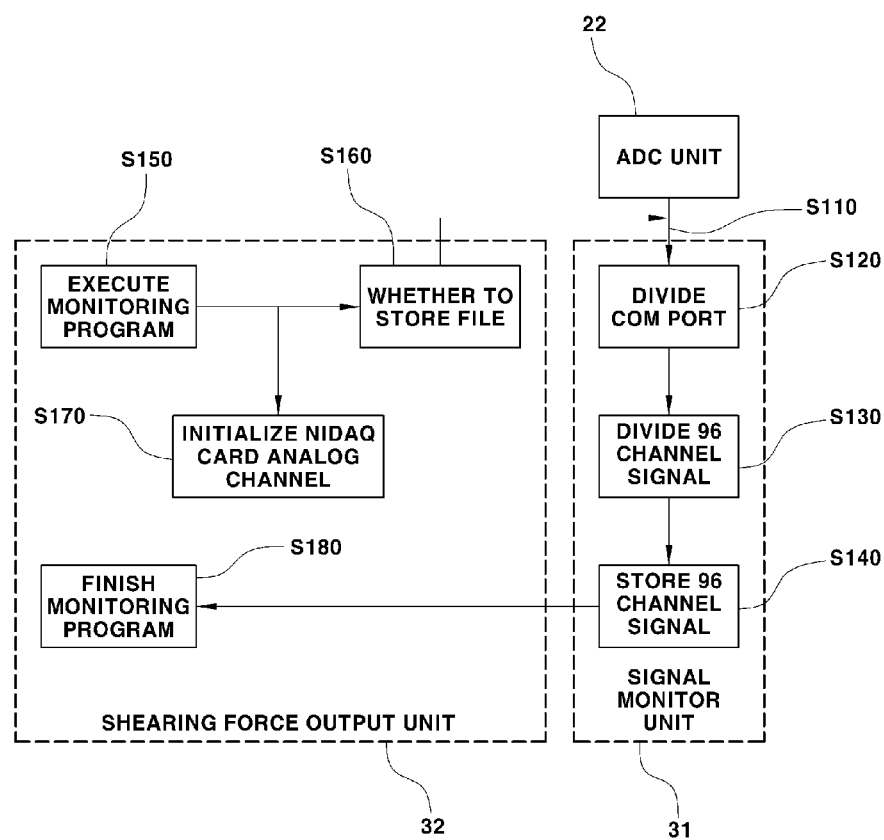
FIG. 10 is a program mimetic view of the monitoring device of FIG. 1.

FIG. 9 is a flowchart illustrating a method for measuring a shearing force upon sitting according to an embodiment of the present invention. FIG. 10 is a program mimetic view of the monitoring device 30 of FIG. 1. First, shearing force sensor 10 may be installed in the seat part 1a, and the signal processor 20 may be executed accordingly. Once the signal processor 20 is executed, the signal monitor unit 31 of the signal processor 20 may display data transmitted from the ADC unit 22 on a screen and store the data accordingly. An executed monitoring program may receive the name of a file to be stored, and the output of a channel may be initialized.

Next, when a user sits on the seat 1 equipped with the shearing force sensor 10, the shearing force sensor 10 measures a frictional force (shearing force) between the user's body and the seat 1. The output value of the shearing force sensor 10 transmitted from the ADC unit 22 is then monitored by a monitoring program manufactured with, e.g., LABVIEW (National Instruments, US), and verifies whether to store the output signal into a file. Any necessary a signal section is then stored accordingly. In this case, when the monitoring program is executed, data transmitted from the ADC unit 22 may be divided into, e.g., COM1, COM2, COM3, and COM4 using virtual ports to be stored in the monitoring program.

The output values of the shearing force sensor 10 with a channel 96, which are received via each port, may be divided by channel to be displayed in real-time in a graph on a screen, and data with the channel 96 may be stored as one, e.g., ASCII file. In this case, measured signals can be checked via the monitoring device 30, and may be stored at a desired section and then the monitoring program ends. After the measurements are made, the signal processor 20 may be powered off accordingly.

An apparatus for measuring a shearing force upon sitting according to the exemplary embodiment of the present invention has the following advantages.

First, it is possible to quantitatively evaluate the lumbar discomfort and the muscle fatigue in complex consideration of a horizontal shearing force as well as a vertical load that affects lumbar discomfort and muscle fatigue when a user is sitting in a seat, by accurately measuring a shearing force acting on each part of the seat using a plurality of shearing force sensors installed in a chair of an office or a seat of a vehicle which frequently contact a human body.

Second, the reliability of a shearing force sensor can be improved by providing a test apparatus for verifying whether an output value of a shearing force sensor is equal to a shearing force that is actually applied, thus verifying the apparatus's accuracy.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for measuring a shearing force upon sitting, comprising:
    a shearing force sensor disposed in a specific area of a seat and configured to sense a shearing force generated by a shearing force sensor upon an individual sitting in the seat;
    a signal processor configured to filter and amplify a signal received from the shearing force sensor and convert an amplified analog signal into a digital signal; and
    a monitoring device configured to analyze the signal converted by the signal processor and display the signal on a screen, wherein a shear force resulting from an individual sitting in the seat is measured in all directions by the apparatus,
    the shearing force sensor includes a lower plate, a middle plate, and an upper plate that are stacked in a three-layered structure, and
    the middle plate includes:
        a cross-shaped strain gauge fixing plate inducing independent strains by disposing strain gauges in transverse and longitudinal directions attached thereto, and
        a fixing part separately disposed across the strain gauge fixing plate and configured to allow the strain gauge fixing plate to be fixed between the lower plate and the upper plate, responding to all directions of shearing forces.

2. The apparatus of claim 1, wherein the middle plate is mounted with a ball bearing that prevents the middle plate from contacting the upper plate so as not to be affected by a vertical load applied to the upper plate.

3. The apparatus of claim 1, further comprising a shearing force sensor test apparatus for verifying whether a measurement value of the shearing force sensor is equal to a shearing force that is actually applied.

4. The apparatus of claim 3, wherein the shearing force sensor test apparatus comprises:
    a sensor fixing part configured to fix the shearing sensor on a horizontal plane;
    a pulley part connected to the sensor fixing part using a wire and configured to convert a vertical force applied to the shearing force sensor into a horizontal force; and
    a standard weight placed on a lower end of the wire downwardly extending from the pulley part to apply a load,
    wherein an accuracy of the measurement value of the shearing force sensor is verified by comparing a mass of the standard weight with a value measured by the shearing force sensor.

5. The apparatus of claim 1, wherein the lower plate, the middle plate, and the upper plate are prevented from being separated from each other by fixing corners thereof with fixing strings.

6. A method comprising:
    sensing, by a shearing force sensor disposed in a specific area of a seat, a shearing force generated upon an individual sitting in a seat wherein a shear force resulting from an individual sitting in the seat is measured in all directions;
    filtering and amplifying, by a signal processor, signals received from the shearing force sensor and converting amplified analog signals into digital signals; and
    analyzing, by a monitoring device, the signal converted by the signal processor and displaying the signal on a screen, wherein
    the shearing force sensor includes a lower plate, a middle plate, and an upper plate that are stacked in a three-layered structure, and
    the middle plate includes:
        a cross-shaped strain gauge fixing plate inducing independent strains by disposing strain gauges in transverse and longitudinal directions attached thereto, and
        a fixing part separately disposed across the strain gauge fixing plate and configured to allow the strain gauge fixing plate to be fixed between the lower plate and the upper plate, responding to all directions of shearing forces.

7. The method of claim 6, further comprising verifying, a shearing force sensor test apparatus, whether a measurement value of the shearing force sensor is equal to a shearing force that is actually applied.

8. A non-transitory computer readable medium containing program instructions executed by a processor, the computer readable medium comprising:
    program instructions that filter and amplify signals representing a shearing force generated upon an individual sitting in a seat wherein a shear force resulting from an individual sitting in the seat is measured in all directions and convert an amplified analog signals into digital signals; and
    program instructions that analyze the converted digital signals and display the signals on a screen, where
    the shearing force sensor includes a lower plate, a middle plate, and an upper plate that are stacked in a three-layered structure, and
    the middle plate includes:
        a cross-shaped strain gauge fixing plate inducing independent strains by disposing strain gauges in transverse and longitudinal directions attached thereto, and
        a fixing part separately disposed across the strain gauge fixing plate and configured to allow the strain gauge fixing plate to be fixed between the lower plate and the upper plate, responding to all directions of shearing forces.

* * * * *